United States Patent [19]

Barbier

[11] Patent Number: 5,598,259
[45] Date of Patent: Jan. 28, 1997

[54] DEVICE TO SIMULATE THE FLOW OF A FLUID SO AS TO CALIBRATE A LASER VELOCIMETRIC DEVICE

[75] Inventor: Dominique Barbier, Pertuis, France

[73] Assignee: Commissariat a l'Energie Atomique, Paris, France

[21] Appl. No.: 364,219

[22] Filed: Dec. 27, 1994

[30] Foreign Application Priority Data

Dec. 28, 1993 [FR] France ................................ 93 15746

[51] Int. Cl.$^6$ .............................. G01P 3/36; G09B 9/00
[52] U.S. Cl. .............................................. 356/28.5; 434/4
[58] Field of Search ........................... 434/1, 4; 356/28.5

[56] References Cited

U.S. PATENT DOCUMENTS 4,600,301  7/1986  Snyder .

FOREIGN PATENT DOCUMENTS 0232890  8/1987  European Pat. Off. .

OTHER PUBLICATIONS

Patent Abstracts of Japan, vol. 8, No. 257 (p-316), Nov. 24, 1984, JP-A-59 126976, Jul. 21, 1984.

*Primary Examiner*—Stephen C. Buczinski
*Attorney, Agent, or Firm*—Oblon, Spivak, McClelland, Maier & Neustadt, P.C.

[57] ABSTRACT

Device to simulate the flow of a fluid for calibrating a laser velocimetric device. This device, able to simulate the flow of a fluid in order to calibrate a laser beam velocimetric chain, comprises a mobile element (8) for simulating the flow of a fluid intercepting at least one laser beam (34, 40) of the velocimetric chain, means (16) for moving the mobile element (8), and means (24) for controlling the movement means (16) so as to apply to the simulation element (8) a movement with a speed varying according to a distribution of speeds selected by an operator.

10 Claims, 2 Drawing Sheets

DEVICE TO SIMULATE THE FLOW OF A FLUID SO AS TO CALIBRATE A LASER VELOCIMETRIC DEVICE

FIELD OF THE INVENTION

The invention concerns a device to simulate the flow of a fluid so as to calibrate a laser velocimetric device able to measure the flow speed of a fluid and also concerns a device for calibrating the velocimetric chain.

BACKGROUND OF THE INVENTION

So as to eliminate any disturbing elements introduced into the flow of a fluid by using traditional means for measuring the flow speed of the fluid, such as Pitot tubes or hot wire devices, laser beam velocimeters are preferably being increasingly used.

Devices for measuring the flow rate by a laser beam make it possible to, not merely avoid disturbing the flow, but also carry out measurements in normally inaccessible flow regions. For example, it is possible to measure through transparent cabin windows the flow rate of a fluid close to a wall of the pipe which carries the flow.

The velocimetric device generally comprise optical elements, an electric unit for processing the signal and a portion for computer-processing the measuring results. All these elements form a unit requiring a fine setting up and complex adjustments to draw up accurate measurements.

Current velocimetric device possess a certain number of adjustable parameters so as to correspond to various measurement applications.

As the estimates of uncertainties regarding the measurements of these devices provided by the manufacturer are often inadequate, it is necessary to calibrate and/or adjust the parameters of the device.

For devices operating on known flows, such as flows around an infinite containment cylinder or calculation modelizable flows, the adjustment and calibration of the velocimeter are obtained simply by comparing the experimental measuring results and the theoretical calculation.

On the other hand, so as to obtain extreme measurement accuracy for an unknown flow, it is essential to refer to a fully known flow simulation device so as to optimize the adjustments of the velocimeter.

Known calibration devices able to simulate a flow may generally be classed into two categories corresponding to the functioning of velocimeters.

The velocimeters of a first category emit two laser beams which interfere in a measuring zone. The passage of a particle of a fluid in a network of fringes of the interference region makes it possible to calculate the speed of this particle. This technique shall be expanded on in more detail in the continuation of the description.

For example, the simulation devices comprise a rough surface or surface with fine wires mounted on a rotating disk and pass into the interference region so as to simulate particles of the fluid.

The American patent U.S. Pat. No. 4,600,301 illustrates this calibrating device. The device described comprises wires stretched on a disk along beams, the disk being driven in rotation by a motor so as to make the wires reel off in the measuring zone.

This patent also refers to a device including a rough surface on a rotating disk simulating the passage of small particles in the measuring zone.

A second category of velocimeters emitting only a single beam function via the Doppler effect, that is by measuring the shift between the transmission frequency and the receiving frequency, this shift being caused by the speed of a particle, for example. As illustrated, in the American patent U.S. Pat. No. 4,176,950, the device comprises a velocimetric device emitting a single laser beam which traverses an optical path between the transmitter and a reflection mirror. Placed on the optical path is a block of a material transparent to the laser light and mounted on the shaft of a motor.

The rotating of the motor and the block causes a periodic and continuous modification of the optical path, thus making it possible to detect the receiving frequency and simulate a flow and able to be profitably used to calibrate the chain.

The devices for calibrating velocimeters of the first category functioning on an interference principle are unable to account for real flow conditions. In fact, the three-dimensional measuring volume defined by the intersection of the interfering beams is intercepted by a rough surface or wire extending inside a bidimensional plane. Thus, only one plane of the measuring volume is active. These devices are incompatible with certain "Doppler burst" detection methods (in which account is taken of an instantaneous multiplication of the number of events measured).

Furthermore, the device possesses a simulation element equipped with a rough surface resulting in a rapid saturation of the photomultipliers which are generally equipped with the velocimetric chains, as a rough surface, as it were, represents a continuous environment with a significant concentration of the measuring particles.

In this respect, the calibration devices of the second category are better adapted to the extent that they are freed from the physical simulation of particles.

At best, the simulation devices are able to account for flows with speeds satisfying a sinusoidal law. Moreover, the devices described earlier and comprising a transparent block rotating in the optical path of the laser beam are unable to simulate a flow other than a flow with a nil average speed.

Now, in order to accurately calibrate the velocimeter, it is essential to refer to a flow simulation as close as possible to a real flow. Real flows are generally characterized by an average non-nil speed and by a statistical distribution around the average speed. This is particularly the case with turbulent flows.

The aim of the present invention is to therefore provide a device for simulating and a device for calibrating velocimeters, said devices not possessing the drawbacks or limitations of the known devices described earlier but being able to calibrate the velocimeters with extremely high accuracy by simulating any real flow and in particular a turbulent flow.

SUMMARY OF THE INVENTION

To this effect, the invention concerns a device for simulating a fluid flow so as to calibrate a laser beam velocimetric device and comprising a mobile element for simulating the flow of a fluid and intercepting at least one laser beam of the velocimetric device and its means for moving the mobile element. According to the invention, the device further includes means for controlling the movement means so as to apply to the simulation element a movement with a speed varying according to a speed distribution selected by an operator.

A variable speed is a speed able to assume various values over a period of time. The passage of the speed from one value to another may be continuous or almost discontinuous.

By means of the invention, it is possible to simulate various flows and thus optimally adjust in each case the velocimetric chain.

In the particular case of a perfectly constant uniform speed laminar flow, the distribution of speeds reassumes at a single speed, namely the speed of the flow.

On the other hand, for a turbulent flow, which is moreover more representative of the number of real flows, the speed distribution shall preferably be a statistical gaussian type distribution.

At this particular moment, the speed of movement varies randomly over a period of time.

According to one advantageous embodiment of the invention, the device comprises means for programming one or preferably several parameters characteristic of speed distribution so as to be able to have this speed distribution conform with the simulated real flow speed distribution.

In particular, the parameters may be the mean speed, standard deviation, the symmetry of distribution and levelling.

According to a further characteristic of the invention, the control means may comprise a programmable calculation unit providing the movement means with speed control signals. The calculation unit is programmed by taking account of the parameters of distribution selected by the user.

Furthermore, automatic control means comprising an optical coder for measuring the speed of the mobile element may be provided so as to more accurately control the movement of the mobile element.

According to one particularly advantageous embodiment of the invention, the mobile element is made of a transparent material seeded with opaque particles. In addition, the element may have the shape of a straight cylinder with a circular base able to be driven in rotation on a shaft around a spin axis perpendicular to the base of the cylinder. When the mobile element is moved, the particles simulate the flow of the fluid. The velocimetric chain emits one or several pairs of laser beams which interfere in one or several measuring zones coinciding with a region of the cylinder situated at a specific distance from the spin axis of the mobile element.

The present invention also concerns a device for calibrating a laser velocimetric chain including a simulation device conforming to the invention, wherein it further includes means for directly measuring the speed of the mobile element and means for analysing these measurements in order to calculate a distribution of speeds directly measured of the simulated flow. Direct speed measurements are understood to be speed measurements obtained by means other than the velocimeter. This calibrating device is able to compare the speeds established by the measurements of the velocimetric chain and the speeds resulting of the direct measurement.

The measuring means may comprise a speed sensor measuring either directly the speed of particles simulating the flow, or the speed of the mobile element itself when there is a simple relation between the speed of the mobile element and the simulated speed.

If the mobile element is a cylinder, the fact that the measuring zone is situated at a specific distance from the spin axis means that there is a direct relation of proportionality between the speed of rotation of the cylinder and the speed of the particles passing into the measuring zone.

The calibration of the set of instruments comprising the velocimetric chain takes place by comparing the particle speed distribution deduced from the measurements of the speed sensor, which may be a tacho generator, and the speed distribution established by the velocimetric chain. Calibration consists of comparing these two distributions as far as possible. To this effect, the comparison may concern, not only the digital values of the mean speed, but also moments of higher order, such as the standard deviations of the distributions.

The deviations between the tacho measuring means and the velocimetric chain make it possible to estimate the measurement uncertainties for the simulated flow and thus for the corresponding type of real flow.

DETAILED DESCRIPTION OF THE PREFERRED EMBODIMENTS

Figure 1:
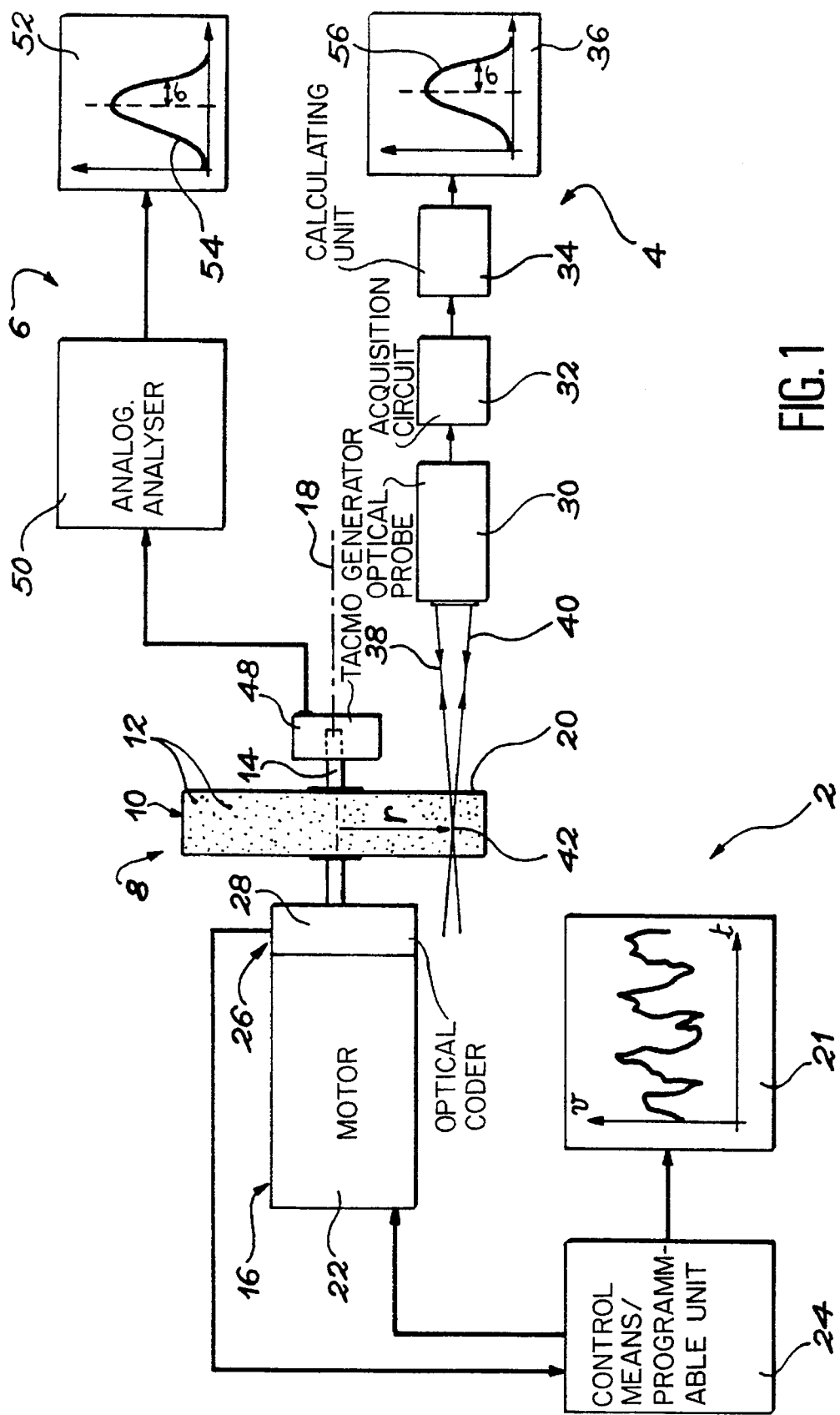
FIG. 1 is a diagrammatic representation of the functional units of a laser velocimetric chain and of an example of the calibrating device of the invention.

The CALIBRATION device of FIG. 1 is mainly composed of a device 2 for simulating a flow, a velocimetric device 4 to be calibrated, and means 6 for directly measuring and exploiting the speed of the simulated flow.

A mobile element 8, formed by a block 10 made of a transparent material having the shape of a straight cylinder and seeded with opaque particles 12, such as Iriodin particles, is driven in rotation by a shaft 14 driven itself by movement means 16. The shaft 14 is orientated along a spin axis 18 perpendicular to a circular base 20 of the cylinder. The movement means comprise a motor 22 connected to the shaft 14 and are controlled by control means 24.

The control means 24 are connected to the movement means and send speed control signals to the motor 22.

The control means comprise a programmable computer or calculation unit able to transmit control signals corresponding to a variable speed according to a specific speed distribution selected by the user according to a certain number of parameters. In particular, the speed distribution may be a statistical gaussian type distribution for which the user is able to program the mean value, the standard deviation, the symmetry or levelling.

Depending on the case, the calculation unit may repeat several times a sequence of control signals corresponding to a given law of speeds so as to be able to embody a mean of speeds for a measuring time selected by an operator and identical to a measuring time selected for the laser velocimetric chain.

A screen 21 is able to display the time controlled speed imposed on the motor.

Automatic control means 26 comprising an optical coder 28 for measuring the speed of rotation of the motor are also connected to the control means and, by means of an automatic control loop, are able to control the accurate functioning of the motor 22.

The velocimetric device 4 comprises in the following order an optical laser transmission probe 30, an electronic acquisition circuit 32, a unit 34 for calculating and analysing the measurements, and finally means 36 for displaying the measurement results and formed, for example, of a video monitor.

The optical probe 30 emits two laser beams 38, 40 which converge towards a measuring region 42 where the two beams interfere. The cylinder 10 is placed on the optical path of the beams with its base 20 approximately perpendicular to the beams. The cylinder 10 is in addition disposed so as to intercept the measuring region 42, that is the interference region of the two laser beams with a given ray r. The passage of a particle from the cylindrical block 10 into the zone 42 causes a diffusion of the laser light detected by the optical probe 30.

Figure 2:
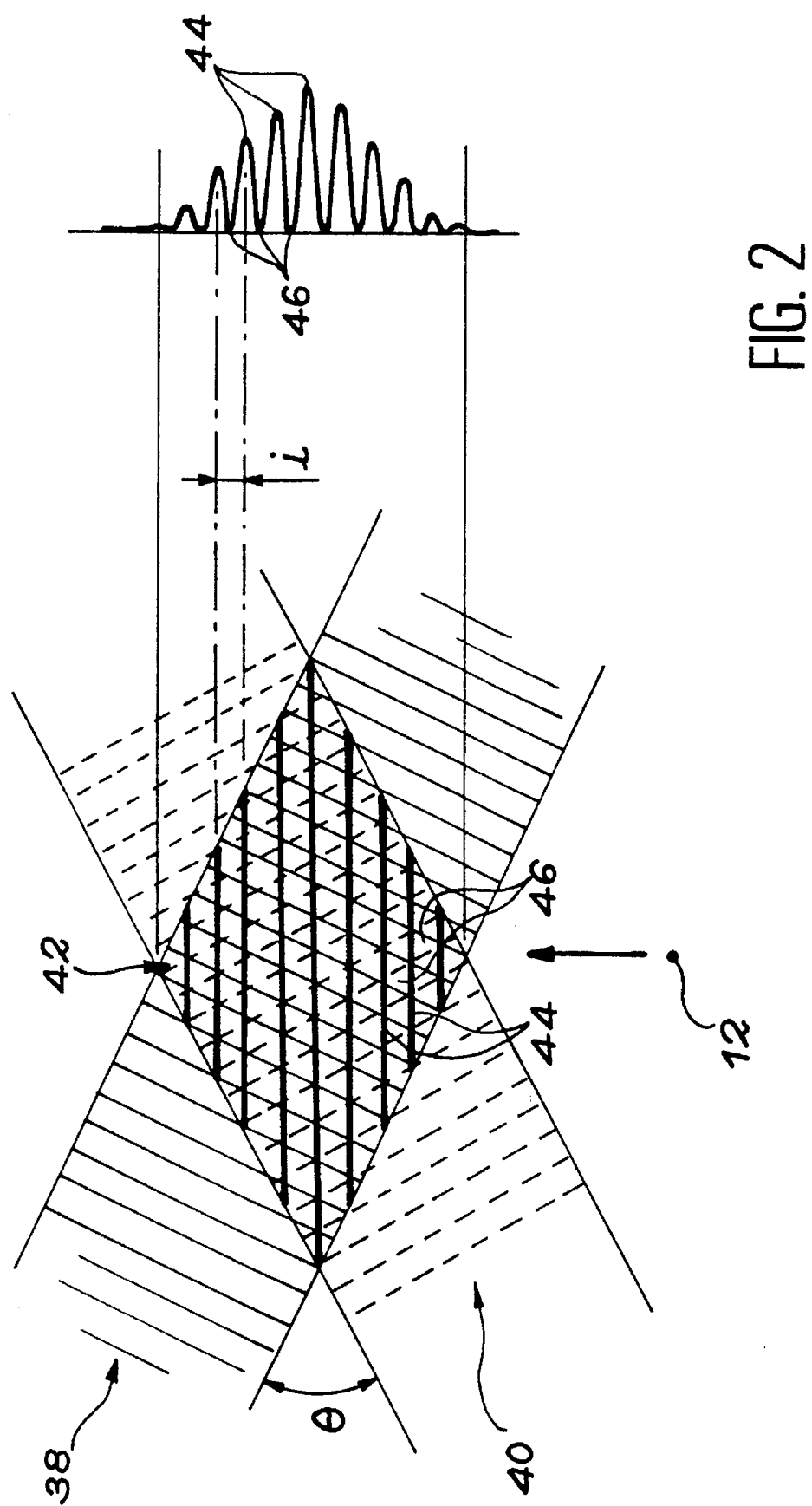
FIG. 2 is a diagram explaining the principle for measuring the speed of a particle simulating a fluid flow by the interference method.

FIG. 2 explains in more detail the principle for measuring the speed of an opaque particle 12.

FIG. 2 shows the beams 38 and 40 which converge and interfere in the measuring region 42. In this region, it is possible to distinguish a succession of luminous interference fringes 44 alternating with dark fringes 46. The distance i separating two successive luminous fringes 44 is fully known to the extent that it only depends on the wavelength of the incident beams 38 and 40 and the angle θ between the directions of these two beams. When a particle 12 of the mobile element 8 (not shown on FIG. 2 for reasons of clarity) traverses the network of fringes, the particle diffuses light which is collected by the probe 30 with the aid of the same optical system as the one used for transmission of the beams 38, 40. By passing successively from one luminous fringe to the next luminous fringe, the particle 12 sends the probe 30 a luminous signal which is then transformed into an electric signal by the circuit 32.

This signal is processed by the calculation unit 34 so as to determine the speed of the particle.

When the particle is driven with a speed V, it takes a time $\Delta T$ for traversing the distance i between two successive luminous fringes with $V=i/\Delta T$. Thus, the calculation unit is able to draw up a table for recording the speeds of the particles 12 of the mobile element 8 traversing the region 42.

The speeds of the particles may also be determined directly without resorting to consulting the velocimeter 4.

This is the rôle of the means 6 for directly measuring and exploiting the speed of the simulated flow.

The means 6 comprise a tacho generator 48 which is connected to an analog analyser 50 and which delivers to the analyser 50 a voltage proportional to the instantaneous speed of rotation ∞ of the mobile element.

Now, the instantaneous speed of the particles traversing the measuring zone 42 is directly proportional to the speed ∞ as the disk intercepts this zone at a distance r given by its spin axis.

Thus, $V=\infty \times r = i/\Delta T$.

The analyser 50 is also connected to a video monitor 52 able to display the speed measurements.

The analyser 50 and analysis unit 34 comprise a program able to display on the monitors 36, 52 the speed distributions 54, 56 respectively drawn up on the basis of the measurements of the velocimetric device 4 and the direct measuring means 6.

A comparison of the mean values of the speed distributions and the higher order moments, such as the standard deviation of the speeds, enables an operator, or possibly a special adjustment device provided to this effect, to adjust the velocimetric device 4.

The adjustment is rendered fine so as to compare as best as possible these distributions 54 and 56.

Secondly and following this adjustment, it is possible to evaluate the deviations between the two distributions for the particular programmed type of flow and evaluate the measuring uncertainties of the velocimeter.

Finally, by means of the invention, it is possible to simulate a fluid flow for the entire volume of the measuring region 42, adapt the size and density of the particles 12 to the real flow to be simulated, and finally account for the speed distributions of any flow, even turbulent ones, by programming the mean speed and various statistical moments.

This device, flexible in use, is able to simulate mean speeds of about several mm/s up to about 10 m/s with possibilities of testing various types of sizes, shapes and concentration of seeding particles 12. The simulation device is valid for any laser velocimetric system (Doppler, network of fringes or double point). This system could also be used to calibrate granulometric measuring chains by seeding the disk with the aid of fully calibrated particles.

Finally, this device may become a calibration bench by virtue of the use of a calibrated techo generator with evaluation of the influence quantities between the output of the generator and display of the analog analyser.

What is claimed is:

1. Device for simulating the flow of a fluid so as to calibrate a laser beam velocimetric apparatus comprising a mobile element for simulating the flow of a fluid intercepting at least one laser beam of the velocimetric apparatus and means for moving the mobile element, wherein said device further including means for controlling movement means so as to apply to the simulation element a movement with a speed varying according to a gaussian type statistical speed distribution selected by an operator.

2. Simulation device according to claim 1, further comprising means for programming a programmable speed distribution parameter selected from a mean speed, a standard deviation speed, a distribution symmetry and levelling.

3. Simulation device according to claim 1, wherein the control means comprise a programmable calculation unit to deliver to the movement means a speed control signal, and means for automatically controlling the speed of the movement of the mobile element.

4. Simulation device according to claim 3, wherein the automatic control means comprise an optical coder for measuring the speed of the mobile element.

5. Simulation device according to claim 1, wherein the mobile element is made of a transparent material seeded with opaque particles, the velocimetric chain being adapted to transmit at least one pair of laser beams and to measure the speed of the particles via the passage of these particles through an interference region of the beams.

6. Simulation device according to claim 5, wherein the particles are calibrated.

7. Simulation device according to claim 5, wherein the mobile element has the shape of a straight cylinder with a circular base and is mounted rotating on a shaft around a spin axis perpendicular to the base of the cylinder, the mobile element being disposed so as to intercept the interference region, the base being orientated approximately perpendicular to the beams.

8. Simulation device according to claim 7, wherein the movement means comprise a motor to drive in rotation the mobile element with a variable speed of rotation in response to the control means.

9. Device for calibrating a laser velocimetric apparatus conforming to claim 1, further including means for directly measuring the speed of the mobile element and analysis means being provided to calculate a distribution of the speeds directly measured of the simulated flow.

10. Calibration device according to claim 9, wherein the simulation device is made to conform to claim 6 and wherein the measuring means comprise a tacho generator for measuring the speed of rotation of the cylinder.

\* \* \* \* \*